Figure 1:
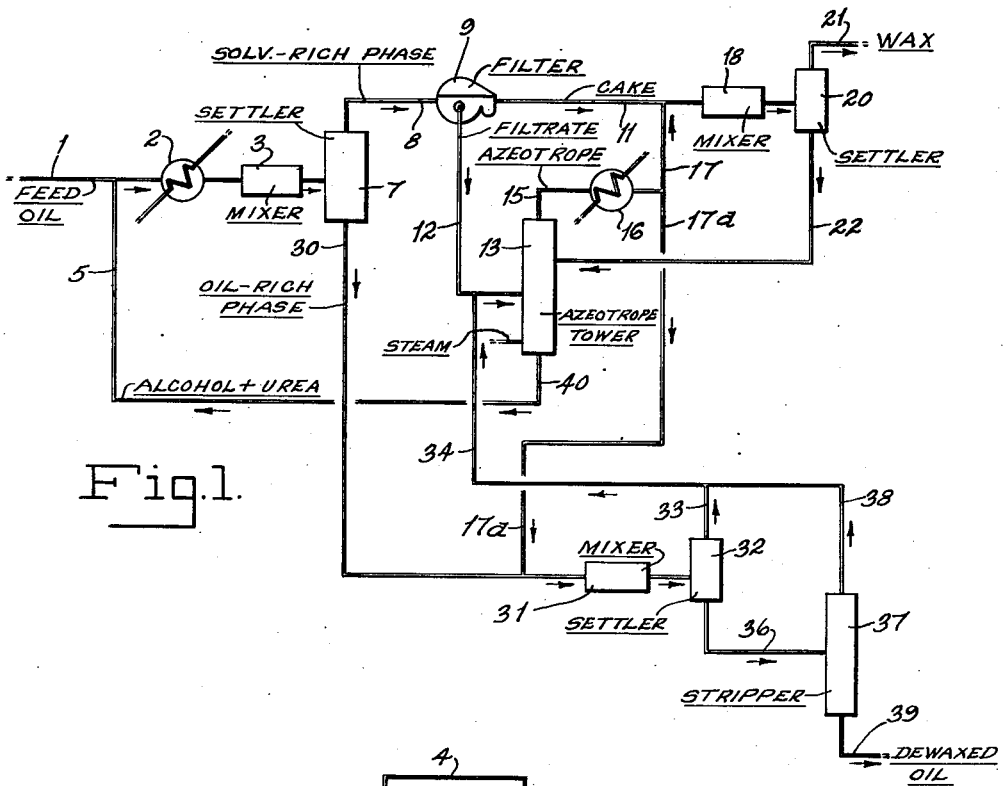
Figure 2:
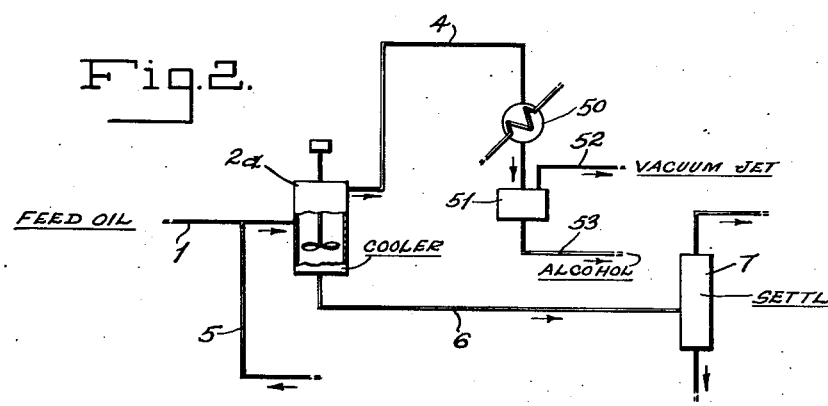

INVENTORS
WILLIAM E. SKELTON
IRVINE F. GERMAN, JR.
HOWARD A. KIRSCH
WALTER V. OVERBAUGH
BY
ATTORNEYS

Patented July 22, 1952

2,604,430

UNITED STATES PATENT OFFICE 2,604,430

CONTINUOUS PROCESS FOR SEPARATION OF WAXLIKE CONSTITUENTS FROM OIL

William E. Skelton, Beacon, Irvine F. German, Jr., New York, Howard A. Kirsch, Beacon, and Walter V. Overbaugh, Fishkill, N. Y., assignors to The Texas Company, New York, N. Y., a corporation of Delaware Application February 24, 1949, Serial No. 78,022

2 Claims. (Cl. 196—17)

This invention relates to a continuous process for separation of wax-like constituents from oil such as contained in hydrocarbon mixtures by treatment with an organic agent such as urea.

The invention concerns a continuous process for separation of wax and wax-like constituents from oil by treatment with an organic complexing agent having the structure:

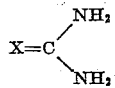

where X may be either oxygen or sulfur. Examples of effective compounds or agents are urea and thiourea, which are capable of forming with waxy constituents of mineral oil solid crystalline complex compounds readily separable from the oil.

The invention involves effecting contact between feed oil and complexing agent in the presence of a polar solvent liquid containing an hydroxyl group under conditions such that formation of the foregoing crystalline complex occurs. Polar solvent liquids such as aliphatic alcohols which exert appreciable solvent action on the complexing agent at temperatures in the range of 125° F. and lower, and substantially increased solvent action at higher temperatures, are effective solvents for the process of this invention. Advantageously the solvent is at least partially miscible with the oil. In addition the solvent liquid is one which is capable of forming azeotropes with water.

As a result of contact between the feed oil and the complexing agent in the presence of the polar solvent there is obtained a slurry or mixture containing solid crystalline complex, oil, excess complexing agent, and solvent. Depending upon the temperature used and the relative amounts of the various components which are present in the foregoing mixture, there may be either one or two distinct liquid phases or layers present, i. e., an oil rich phase and a solvent rich phase. Also, in addition to the crystalline complex, the solid material may include excess solid complexing agent over and above the amount which enters directly into complex formation. This said solid material is separated by suitable means from the liquid layer or layers. The solid material is treated to break the complex and separately recover its components, the recovered complexing agent and solvent being returned for reuse in the process. The liquid layer, or layers are treated to recover components thereof.

The present invention is particularly concerned with the recovery of solvent liquid and complexing agent. Thus in accordance with this invention, the crystalline complex material after separation from the liquid medium is treated with an azeotropic mixture of solvent and water under conditions effective to decompose the complex with liberation of oily constituents therefrom and forming a solution of complexing agent in solvent liquid. The azeotropic mixture used in this treatment is obtained by azeotropic distillation of solvent-rich liquid or liquids subsequently recovered from the complex and also recovered from complex-free or relatively complex-free oil.

The complex-free, or relatively complex-free, oil retains some residual complexing agent and in accordance with the process of this invention it is also treated with a portion of the aforementioned azeotropic mixture under conditions effective to extract the residual agent therefrom.

The resulting extract solution from this latter operation as well as that obtained in the decomposition of the complex provide the feed to the azeotropic distillation. From this distillation there is obtained a residual liquid consisting essentially of solvent and dissolved complexing agent which is recycled for use in treating fresh feed oil.

As will be seen from the subsequent detailed description of the invention, it provides a continuous flow operation. A complexing agent is recovered and handled in the form of a solution so that it is easily transferred within the system by conventional pumps. This avoids resort to crystallization or evaporation in the recovery of the complexing agent for return to the initial contact with feed oil. Moreover it appears that the azeotropic mixture of solvent and water provides an excellent medium for recovering the used complexing agent from both the solid complex and the complex-free or relatively complex-free oil.

In order to describe the invention in more detail reference will now be made to the accompanying drawing in which Fig. 1 comprises a flow diagram for carrying out the process.

The flow diagram will be described with reference to the separation of wax from a light lubricating oil stock such as used in the manufacture of refrigerator lubricating oils. Such stock may have a Saybolt Universal viscosity of 300 seconds at 100° F., containing about 1.0% wax by volume and having a pour test of minus 25° F.

The feed oil is obtained from a source not shown through pipe 1 and conducted through an exchanger 2 to a mixer 3. Prior to passage through the exchanger 2 the oil is commingled with a stream of normal propyl alcohol saturated or substantially saturated with urea at a temperature of 120° F. to 200° F. This solution is conducted through a pipe 5 from a subsequent point in the system and to which reference will be made later.

Since the alcohol-urea mixture is at elevated temperature it is advantageous to pass the resulting mixture through the exchanger 2 wherein it is cooled to a temperature in the range of about 70 to 125° F. and such that solid urea is present in the mixture.

If desired, a mixing vessel provided with a cooling coil may be used in which case the feed oil and the hot urea solution may be separately introduced into the vessel and subsequently reduced to the aforesaid temperature at which urea crystallizes from the alcohol. Cooling may be effected by evaporative means as will be described with reference to Figure II.

The amount of urea added to the feed oil may amount to about 3 to 6 parts by weight of the wax constituents of the oil, while alcohol may amount to from about 1 to 3 volumes per volume of feed oil.

Wax constituents quickly enter into complex formation with the urea forming a crystalline complex consisting of about 25% wax and 75% urea by weight. X-ray analysis of the complex indicates that the urea crystal which is normally tetragonal in form transforms itself into a hexagonal system in the resulting crystalline complex.

The resulting mixture or slurry of crystalline complex, oil and solvent liquid is passed into a settler 7 maintained at substantially the contacting temperature to permit stratification into layers.

The upper layer comprises a solvent-rich phase containing crystalline complex and it is drawn off through pipe 8 to a filter 9.

The filter may be a conventional continuous rotary drum filter. As a result of filtration there is formed a filter cake of crystalline complex and comprising for example about 42.7% urea, 33.3% wax and oil, 24.0% alcohol.

This filter cake is discharged through pipe 11.

Filtrate obtained is discharged through pipe 12 and will comprise approximately 61.3% oil, 1.7% urea and 37% alcohol.

This filtrate is passed to an azeotropic distillation column 13 wherein it is used to carry in solution from said column 13 urea which is introduced to said column 13 by the streams in pipes 34 and 22. From the column is taken overhead a distillate azeotrope consisting of about 28.3% water and 71.7% alcohol. The distillation is carried out at about atmospheric pressure maintaining a temperature of about 225° F. at the bottom of the column and a temperature of about 190° F. at the top thereof.

The distillate is removed through pipe 15 and condenser 16.

A portion thereof, for example about 1/3 by volume is diverted through pipe 17 to pipe 11 through which the filter cake is conducted. The cake and azeotrope are subjected to mixing in a mixer 18 at a temperature of about 163° F. and then passed into a settler 20 maintained at substantially the same temperature and approximately atmospheric pressure. At this elevated temperature the complex breaks down with liberation of wax constituents therefrom. In the settler 20 the wax separates as an upper layer which is withdrawn through pipe 21. The withdrawn wax amounts to about 1.5% by weight of the feed oil. It may be subjected to further treatment if desired such as washing with solvent to remove residual small amounts of urea that may be retained therein.

The lower layer accumulating in the settler 20 is withdrawn through pipe 22 and comprises approximately 24.2% urea, 58.2% alcohol and 17.6% water. This liquid mixture is passed into the previously mentioned column 13 wherein it is subjected to azeotropic distillation.

The oil-rich phase accumulating in the lower portion of the settler 7 is drawn off through pipe 30 and will comprise approximately 21% alcohol, 78.4% oil and 0.66% urea. This stream is passed to a mixer 31 wherein it is commingled with the remaining portion of the azeotrope stream flowing through pipe 15 and being diverted through pipe 17a. This mixing is effected at a temperature of about 100° F., the resulting mixture flowing through the mixer 31 comprises about 2.53% water, 25.7% alcohol, 71.13% oil and 0.64% urea. This mixture flows into a settler 32 maintained at about 100° F. wherein stratification into layers occurs. The upper layer comprising mainly alcohol and containing small amounts of oil is drawn off through pipe 33 and returned by pipe 34 to the column 13.

The bottom layer is drawn off from settler 32 through pipe 36 and comprises about 93.65% oil, 6.30% water-alcohol, 0.05% urea. This stream is conducted through pipe 36 to a stripper 37 wherein it is subjected to distillation advantageously at atmospheric pressure and at a temperature in the range of 195° to 300° F. such that alcohol and water are distilled from the dewaxed oil. The resulting distillate is removed through pipe 38 and passed into pipe 34 for charging to the column 13.

Solvent-free dewaxed oil is removed from the bottom of stripper 37 to pipe 39. Thus withdrawn oil may be subjected to washing or such other treatment as may be necessary to remove the small amounts of residual complexing agent retained therein.

From the bottom of the distillate column 13 there is drawn off through pipe 40 a residual liquid fraction consisting essentially of alcohol and dissolved urea with some oil, the urea amounting to about 5 to 10% by weight of the solvent. This solution is conducted to previously mentioned pipe 5 by which it is recycled for treating fresh feed oil.

The aforementioned dewaxed oil removed from pipe 39 will have a pour test of about minus 25° F. However it will have a "Freon Haze" test of about minus 65 to minus 75° F. as compared with about minus 22° F. for the feed oil.

The aforesaid "Freon Haze" is determined by mixing the oil with "Freon 12" (dichloro difluoro methane) in the proportion of about 90% "Freon 12" to 10% oil and chilling the mixture to the point at which wax haze appears.

As previously indicated, evaporative cooling may be used in place of the exchanger 2. Thus referring to Figure II, the hot alcohol-urea stream from pipe 5 is commingled with the feed oil stream in pipe 1 and the resulting mixture passed into a vessel 2a provided with a stirring mechanism as indicated. A reduced pressure is maintained therein such that evaporation of alcohol from the mixture occurs with refrigerative effect. The alcohol vapors are removed through pipe 4 and condenser 50 which discharges into a receiver 51 which communicates through pipe 52 with a vacuum jet or other means for reducing the pressure. Condensate is discharged through pipe 53. Alcohol removed as condensate can be reused in the system. Provision may be made for adding additional alcohol to the oil mixture entering cooler 2a in order to supply the necessary evaporation for cooling.

The slurry accumulating in the bottom of cooler 2a is drawn off through pipe 6 to the settler 7 of Figure I.

While mention has been made of employing a filter 9 it is contemplated that other means may be employed such as centrifuging, settling or thickening to effect separation of the crystalline complex from the solvent-rich phase.

While normal propyl alcohol is a preferred polar solvent for carrying out the process, nevertheless it is contemplated that other materials may be employed or other polar solvents having the requisite solvent characteristics as previously defined.

Although the specific example refers to the treatment of a low wax content feed oil, nevertheless it is contemplated that the process may have application to the treatment of other wax-bearing mineral oils and also to the treatment of wax concentrates etc. In the case of the more viscous or higher molecular weight feeds, it may be advantageous to employ a non-polar solvent liquid as a diluent, examples of which are the conventional hydrocarbon solvents such as petroleum naphtha or naphtha hydrocarbons. Oil derived from other sources such as animal, vegetable and marine sources may be treated in accordance with this invention.

Urea enters into complex formation with certain naphthenic and aromatic compounds having long aliphatic side-chains and also enters into complex formation with oxygenated compounds. Accordingly, the process may be used in the separation of constituents other than wax from oil or oily substances containing them.

While urea has been specifically mentioned, it is contemplated that substituted derivatives, such as ethanol urea, diethyl urea and butyl urea may be used as well as other derivatives containing various di-, tri- and/or tetravalent inorganic and/or organic compounds.

Obviously many modifications and variations of the invention, as hereinbefore set forth, may be made without departing from the spirit and scope thereof, and therefore only such limitations should be imposed as are indicated in the appended claims.

We claim:

1. In a continuous process of separating wax from a feed mixture of wax and oil by contact with a complexing agent having the structure:

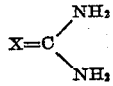

where X is selected from the group consisting of oxygen and sulfur, the method comprising contacting the feed oil in a contacting zone with said agent in the presence of a low molecular weight aliphatic alcohol, forming in said zone a mixture of solvent, oil and crystalline complex of wax and said agent, stratifying said mixture at a temperature of about 70 to 125° F. into a primary oil-rich layer and a primary solvent-rich layer containing crystalline complex, separately withdrawing said primary layers, commingling withdrawn oil-rich layer with a portion of an azeotropic mixture of alcohol and water obtained from a source referred to later to form a first commingled mixture, subjecting said first commingled mixture to settling at a temperature of about 100° F. to form a secondary alcohol-rich layer and a secondary oil-rich layer, separately withdrawing said secondary layers, distilling alcohol from withdrawn secondary oil-rich layer to leave a substantially wax-free oil, discharging said wax-free oil, mixing said distillate with said secondary alcohol-rich layer, passing the last mentioned mixture into the intermediate portion of a steam distillation tower, filtering from said primary solvent-rich layer a filter cake of crystalline complex and forming a filtrate comprising mainly alcohol, passing said filtrate to the intermediate portion of said steam distillation tower, mixing said filter cake with another portion of said azeotropic mixture of alcohol and water obtained from the aforesaid source referred to later, subjecting this last mentioned mixture to heating at elevated temperature sufficient to decompose the complex and liberate wax, discharging liberated wax from the hot solution of complexing agent in solvent, passing discharged hot solution into the upper portion of said steam distillation tower, injecting steam into the lower portion of said steam distillation tower, effecting steam distillation therein to form an azeotropic distillate of alcohol and water, and using said distillate as the source of the aforesaid azeotropic mixture of alcohol and water.

2. The method according to claim 1 in which the complexing agent is urea.

WILLIAM E. SKELTON.
IRVINE F. GERMAN, JR.
HOWARD A. KIRSCH.
WALTER V. OVERBAUGH.

REFERENCES CITED

The following references are of record in the file of this patent:

UNITED STATES PATENTS

| Number | Name | Date |
|---|---|---|
| 2,167,730 | Smoley | Aug. 1, 1939 |
| 2,163,570 | Kraft | Aug. 8, 1939 |
| 2,499,820 | Fetterly | Mar. 7, 1950 |

OTHER REFERENCES

Technical Oil Mission, Reel 143, translation by Shell Development Co. of German application B. 190,197 (Bengen), deposited in Library of Congress May 22, 1946 (included in Index released May 31, 1946), 5 pages, pages 2–6, inclusive, only.